Jan. 9, 1962 H. STAMPFLI 3,016,065
SERVO-VALVES
Filed Jan. 19, 1959 2 Sheets-Sheet 1
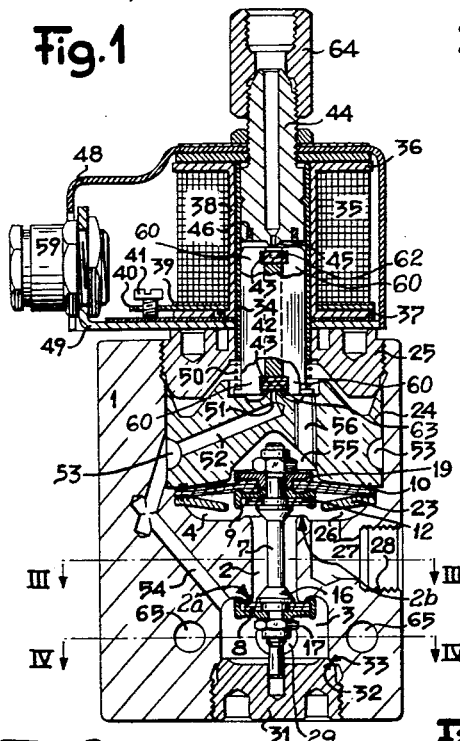
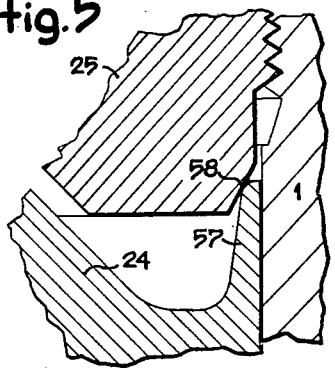
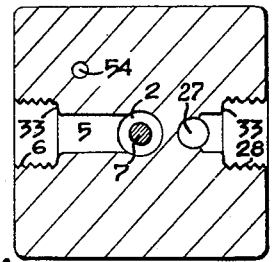
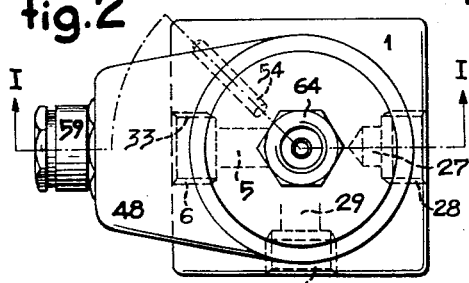
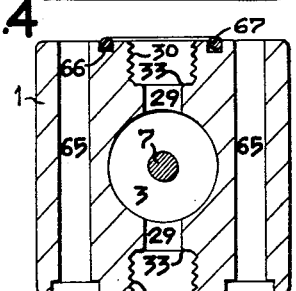
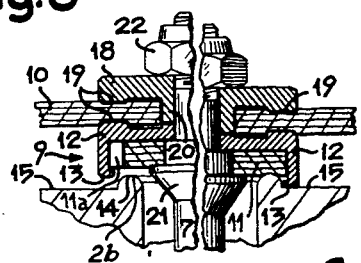
INVENTOR
HARALD STAMPFLI
BY Emory L. Groff
ATTORNEY Jan. 9, 1962 H. STAMPFLI 3,016,065
SERVO-VALVES
Filed Jan. 19, 1959 2 Sheets-Sheet 2
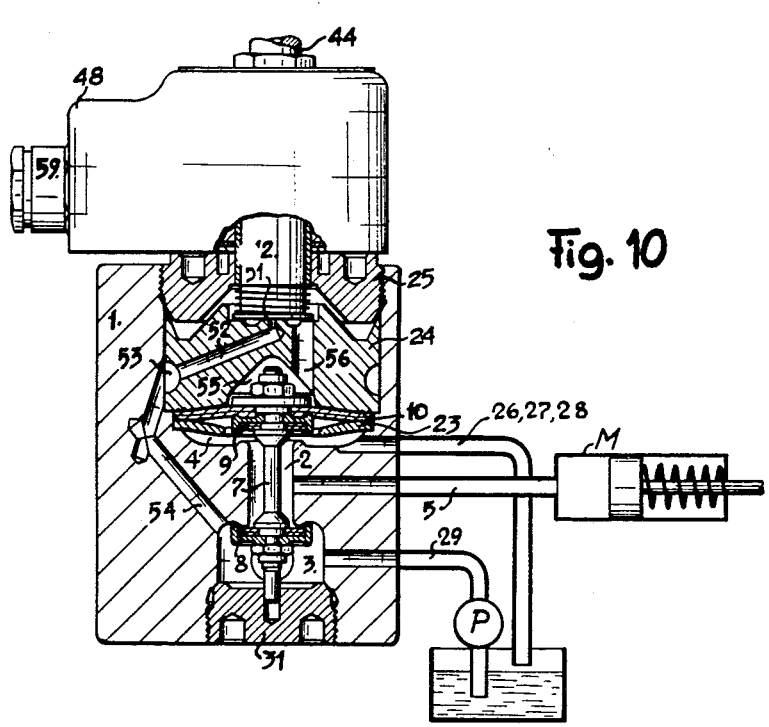
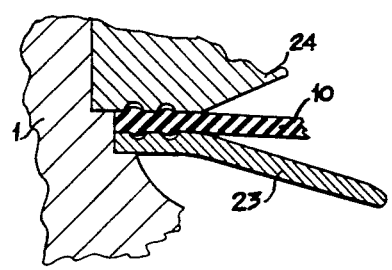
INVENTOR
HARALD STAMPFLI

United States Patent Office 3,016,065
Patented Jan. 9, 1962

3,016,065
SERVO-VALVES
Harald Stampfli, Geneva, Switzerland, assignor to Lucifer
 S.A., Carouge, Geneva, Switzerland, a corporation of
 Switzerland
Filed Jan. 19, 1959, Ser. No. 787,750
Claims priority, application Switzerland Feb. 26, 1958
8 Claims. (Cl. 137—623)

Servo-valves are already known comprising at least one valve controlled by a diaphragm and means for causing a fluid under pressure to act on at least one of the faces of the diaphragm, the central part of said diaphragm being clamped between the two washers secured to a rod carrying the valve, said valve comprising a body having at least two passages connected together by an orifice capable of being closed by the said valve.

In servo-valves of this type, passages are in general provided permitting of applying a fluid under pressure at least on one face of the diaphragm for controlling the movement thereof and the opening or closing of one or more valves. The supply of fluid under pressure to said passage is often controlled by an electromagnetic controlled valve. In known construction of this type, it is difficult to obtain high speeds of actuation of the servo-valve and up to the present no attempt has been made to construct a type of servo-valve which can be used equally well for the control of liquids as for that of gaseous fluids. Constructors have always provided at least two types of valves of which the theoretical functioning is identical but which are distinguished from one another by variations in diameter of the passages and of the diameter of the orifices controlled by the electromagnetic valve, one of these types being provided for gaseous fluids and the other for liquids. Further, the construction of the known servo-valves is relatively complicated.

The present invention has for its object a servo-valve of which the construction is simple and economical and which also presents the considerable advantage of being capable of being used without any modification, equally well for gases and for liquids, whilst having a speed of reaction very much higher than valves known up to the present time.

The invention relates to a servo-valve comprising at least a valve controlled by a diaphragm and means for causing a fluid under pressure to act on at least one of the faces of the diaphragm, the central part of said diaphragm being clamped between two washers secured to a rod carrying the valve, said valve comprising a body having at least two passages connected together by an orifice capable of being closed by the said valve, characterised in that its body has an annular bearing surface for the diaphragm, the outer edge of said diaphragm being pressed against said bearing surface by a part covering the whole diaphragm and shaped in such a manner that a chamber is defined between said part and the diaphragm, said part being clamped against a second part, a closed chamber being comprised between said two parts, the first part having, on the one hand, a passage causing the two said chambers to communicate with one another and, on the other hand, a passage adapted to be supplied with a fluid under pressure, said latter passage leading to an orifice opening in the chamber comprised between the two parts, the second part carrying a movable element capable of being controlled so as to close the said orifice.

One form of construction of the servo-valve forming the subject of the invention is shown diagrammatically and by way of example in the accompanying drawings, wherein:

FIG. 1 shows this form of construction in a section made in a number of planes, as indicated by the line I—I of FIG. 2.

FIG. 2 is a diagrammatic view of this form of construction.

FIGS. 3 and 4 are horizontal sections on the lines III—III and IV—IV respectively, of FIG. 1.

FIG. 5 shows a detail of a joint.

FIGS. 6 and 7 are respectively a view in section and a view in plan of a magnetic core for controlling the valve.

FIGS. 8 and 8$^a$ are detail views partly in section and partly in elevation respectively, showing the upper valve assembly in open and closed positions respectively, relative to the same valve seat at the upper end of the central bore.

FIG. 9 is an enlarged detail sectional view illustrating the manner in which the diaphragm is clamped between the block and the shoulder of the body along with the washer which covers the outer face of the body.

FIG. 10 is a schematic view clarifying the operation as well as the arrangement of the pressure in the passage, the work passage, and the exhaust passage.

The servo-valve illustrated comprises a body 1 of inoxidizable material of parallelepiped shape to facilitate multiple use in banks or rows when required.

The body 1 has an axial bore 2 connecting a first cylindrical cavity 3 with a second cylindrical cavity 4. These cavities are of different diameter but have a mutually common axis which is the same as the axis of the bore 2. A valve seat 2$^a$ is provided at one end, namely the lower end of the bore 2 as shown in FIG. 1, and a valve seat 2$^b$ at the other end of the bore, namely the upper end shown in FIG. 1. The axial bore 2 communicates with a transverse work-performing passage 5 which supplies pressure to the device or apparatus to be operated or controlled through a pipe, not shown, but connected to the body 1 at the internally threaded socket 6.

A valve stem 7 operates in the bore 2 and said stem carries at its lower end a primary valve head assembly 8 and a secondary valve head assembly 9 at its upper end. The primary valve head assembly is disposed in the first cavity 3 and the secondary valve head assembly is located in the second cavity 4.

FIGS. 8 and 8$^a$ show the manner in which the secondary valve head 9 is constructed to secure the stem 7 to a diaphragm 10 adapted to actuate the valve heads 8 and 9 respectively. The diaphragm has its inner face exposed to the second cavity 4 and an outer face which is exposed to the inner end of the block 24 and vent means 55, 56, as will later appear more in detail.

The secondary valve head assembly 9 includes a lining 11 of elastic material, lodged in a metallic cup 12 whose edge 13 is flanged inwardly towards its axis in a manner to prevent the lining from accidental displacement from the cup. Further, the thickness of the lining 11 is less than the height of recess of the cup 12 and has a notch 11$^a$ at its peripheral edge, said notch constituting a passage for effecting the escape of a small quantity of fluid which may lodge accidentally between the lining 11 and the bottom 13 of the cup 12.

The aforesaid seat 2$^b$ is formed by an annular rib projecting from the surface of the substantially plane base of the second cavity 4 and forms an abutment for the edge 13 of the cup 12.

FIGURE 8 shows the relative position of the valve head 9 to the seat 2$^b$, that is when the valve 9 is in the open position. FIGURE 8$^a$ shows the relative position of the valve head 9 to the valve seat 2$^b$ when the said valve 9 is closed. In this position the lining 11 is deformed by the valve seat 2$^b$, but this deformation is limited by the fact that the edge 13 of the cup 12 abuts against the surface of the base. Thus, even when a closing force of considerable magnitude is applied through the stem 7, the lining 11 is not subjected to undue force or pressure which would contribute to rapid wear.

The bottom or primary valve head assembly 8 is constructed in the same manner as the upper valve head assembly 9, that is to say, a lining lodged within a flanged cup which is clamped in position on the stem against shoulder 16 by a locking nut, as shown.

The diaphragm 10 is axially secured to the stem 7 and is clamped between the base of the cup 12 of the upper or secondary valve head assembly 9 and a disc 18, each of which have an annular offset edge portion 19 engaging opposite sides of the diaphragm 10.

As shown in FIGURE 8 the disc 18 at the top of the valve head assembly 9 is provided with a centrally disposed collar 20 surrounding the stem and adapted to abut against the rear face of the cup 12, when the assembly 11, 12 and 18 is clamped on the threaded shank of the stem 7 between shoulder 21 and a locking nut 22. Therefore, the distance between the cup 12 and the washer 18 is determined in a manner to prevent crushing of the central portion of the diaphragm 10 to insure its longevity.

The diaphragm 10 has its peripheral portion secured to the body 1 by compressing said edge between a washer 23 and the inner end of a cylindrical block 24 fitting into the upper cavity 4. It will also be noted that the peripheral portion of the washer 23 rests on the lower step of a shouldered inner abutment adjacent the junction of the face 15 with the side wall of the cavity. Thus, it will be seen that the outer peripheral edge portions of the diaphragm 10 and the washer 23 are confined between the lower step of said abutment by the bottom peripheral edge of the said insertable cylindrical block 24.

The upper cavity 4 of the body is internally threaded near its mouth to receive the threads of externally threaded closure ring 25 which secures the block in the casing 1. These features will be further described in connection with FIG. 5.

The inner face of the diaphragm 10, with the bottom of the cavity 4, defines a chamber 26 into which leads an exhaust passage 27 drilled radially in the body of the valve and having a threaded socket 28 enabling it to be connected to an external pipe connection, not shown. When the valve 9 is raised from its seat 26 and the valve 8 is pressed against the seat 2ª, the valve permits this passage 27 to communicate with the transverse passage 5. When the valve 9 is applied to its seat, the valve 8 at the same time moves away from its seat, so that the passage 5 can communicate with the recess 3 into which open two alined transverse bores 29 (FIG. 4) each provided with a threaded socket 30. This second position thus provides a fluid path leading to the passage 5 and puts it into communication with a passage connected to one of the two threaded sockets 30, the other socket 30 being, for example, closed by a plug, not shown.

The recess 3 is closed at its lower portion by a screw plug 31 fitted into a corresponding threaded portion of the body 1 of the valve. It is to be observed that said plug 31 has a beveled edge 32 of smaller diameter adapted to come into contact with a shoulder 33 of the first cavity 3, said shoulder 33 having a smaller diameter than that of the thread of the plug 31. The shoulder 33 and the beveled edge 32 of the plug are arranged in such a manner that their surface of contact is truncated in order to obtain fluidtightness without the interposition of a gasket of deformable material. The other threaded bores of the valve are formed in an analogous manner and have an internal shoulder of smaller diameter than that of the screwed portion, as indicated by 33 for the threaded sockets 6, 28 and 30 shown in FIGS. 3 and 4. In this manner, these threaded bores permit of screwing connections for different passages of the valve, without the interposition of gaskets of deformable material, these connections, having a part of substantially truncated conical shape adapted to be forced against their respective shoulders. This arrangement is very advantageous, as the joints of deformable material, such as synthetic rubber, are often deteriorated by high or very low temperatures, are sometimes attacked by liquids of which the flow is controlled by the valve and may sometimes be subjected to a swelling or contraction due to their contact with some fluids.

The closing ring 25 carries a tube 34 surrounded by an electric winding 35. Said latter is of cylindrical shape and placed on a coil spool of insulating material formed, in the usual manner, by two flanges 36 and 37 connected by a tubular hub 38. A washer 39 of insulating material is pressed against the flange 37 by the winding 35 itself and two connection terminals, of which only one 40, is visible in the drawing, are held between said flange 37 and the insulating washer 39. The two ends of the winding 35 are welded to these connecting terminals and screws 41 enable the winding easily to be connected with an electric supply line.

The interior of the tube 34 slidably accommodates a core 42 (FIG. 6 and 7) of cylindrical shape and carrying a sealing member 43 of elastic material fitted into each of its ends. The tube 34 also contains a stationary nipple member 44 of ferromagnetic material and is provided with an orifice 45 communicating with the interior of the tube 34 at the side of the sliding core 42. Around said orifice 45 is provided an annular groove in which is located, in the known manner, a copper ring 46 adapted to produce a magnetic field out of phase relatively to a field induced by the winding 35, when said latter is supplied with alternating current.

When the winding 35 is energized, a magnetic field is produced attracting the core 42 against the lower end of the fixed nipple 44 so that the orifice 45 is closed by the said core. The magnetic flux is closed at the exterior of the winding 35 by passing through an iron washer 47 placed the flange 36 of the coil spool, then a protecting cover 48 for the winding and finally a base 49 is placed under the winding 35 and surrounding the tubular part 34. A conventional fitting 59 is secured to the base 49 to permit of the passage of wires for the supply of current to the winding 35 through a notch of the cover 48.

The core 42 is subjected to the action of a spring 50 tending to withdraw it from the stationary nipple 44 and to apply its lower lining 43 against an orifice 51 provided in the upper core seating face of the cylindrical block 24. Said orifice 51 is supplied with fluid under pressure by a transfer passage 52 of the cylindrical block 24 leading into an annular groove 53 of said cylindrical block, said groove being itself supplied with fluid by means of a substantially radially disposed by-pass 54 drilled in the body of the valve and leading into the lower cavity 3. A chamber 55 is defined by the lower face of the cylindrical plug 24 and the upper face of the diaphragm 10. A vent 56 causes this chamber to communicate with the space located between the cylindrical block 24 and ring 25. This space should be closed hermetically relatively to the outside of the valve and the same applies to the space comprised between the part 24 and the inner wall of the seat in which this is placed, in such a manner as to avoid leakages to the outside of the fluid under pressure which may be located in the circular groove 53. For ensuring fluid tightness of these two separate spaces, the cylindrical block 24 has an annular tongue 57 shown to a larger scale in FIG. 5. Said tongue 57 is adapted to come into contact with a truncated part 58 of the ring 25, in such a manner that during the tightening of the diaphragm 10 through the medium of said ring 25, said tongue is clamped between the truncated part and the inner wall of the recess of the body 1, in such a manner as thus to constitute a double joint. The angle of the truncated part 58 should be selected in such a manner that the tightening of the tongue 57 between said truncated part and the wall of the recess does not cause any automatic wedging, which would prevent axial movement of the cylindrical block 24 to clamp the outer edge of the diaphragm 10 against the lower shoulder of the stepped abutment.

FIGS. 6 and 7 show in detail the magnetic core 42 and show that this has fluid escape means in the form of two longitudinal grooves 60 and 61 diametrically opposed and provided in its cylindrical wall. Each of said grooves has a depth at least equal to three quarters of the radius of the cylindrical core 42. The cross-section of passage provided by these two grooves is at least equal to twenty times the cross-section of the orifice 45. As will be seen in FIG. 6, each lining 43 is placed at the bottom of a seat, a space 62, 63 respectively, subsisting between each end face of the core 42 and the respective lining 43. The grooves 60 and 61 lead into the spaces 62 and 63 so that when the core 42 is attracted against the nipple 44 and its upper face abuts against said latter, the pressure of fluid coming through the orifice 51 acts also in space 62. This arrangement facilitates the detachment of the core 42 from the nipple 44 when the excitation of the winding 35 is cut off, which permits of an excellent functioning of the core 42 in liquids, for example oil. This advantage is not obtained in analogous known constructions. Further, it is necessary to observe that the stops are provided for acting on the core 42 in each of its extreme positions and thus limit the maximum pressure between each of the linings 43 and the seat of the corresponding orifice. When the core 42 is in its highest position, its upper face abuts against the lower face of the nipple 44. In the lowest position of the core, its lower face abuts against a boss having an orifice 51 of the core seating face of cylindrical block 24.

The operation of this valve is as follows:

The fluid under pressure, of which the flow should be controlled and directed by the valve, is supplied to the lower cavity 3 by a pressure inlet passage 29 by pipes, not shown, secured to the body of the valve by a connection secured in the threaded sockets 30 (FIG. 4). The other threaded socket 30 is closed by a plug, not shown. When the magnetic core 42 is not subjected to the attraction of the magnetic field, it is maintained in the position shown in FIG. 1 by the spring 50, in such a manner that its lower lining 43 closes the orifice 51 and that the fluid under pressure located in the first cavity 3 cannot pass out through the passages 54 and 52 and the orifice 51.

The pressure of fluid in the cavity 3 acts on the valve head 8 and maintains it in contact on its seat 2ª, which prevents the flow of fluid through bore 2, whilst the passage 5 and the outlet or exhaust passage 26, 27, 28 are placed into communication by means of a valve head 9 which is raised from its seat. The fluid which is in the chamber 55, formed between the upper face of the diaphragm 10 and the bottom of cylindrical block 24, is connected to exhaust by the passage 56, then by the grooves 60 and 61 provided in the core 42 (not visible in FIG. 1) and finally by an orifice 45. It should now be noted that when the control fluid is a liquid or a gas which is to be recovered, it is possible to secure a passage for the recuperation of said fluid through the nipple 44 by means of a coupling 64. On the contrary, when this fluid is air, it is not necessary to recover it and it may be allowed to escape into the atmosphere directly through the axial passage in the nipple 44.

When an excitation current is passed into the winding 35, a magnetic field is created which causes a movement of the core 42 in the direction of the nipple 44. This movement, which is only of a few millimeters, suffices to uncover the orifice 51 and close the orifice 45 in the bottom of the nipple 44. As a result fluid under pressure, conducted into the first cavity 3, flows through the passages 54 and 52, then through the orifice 51, for penetrating into the chamber comprised between the cylindrical block 24 and nipple 25. Through these it passes through the vent 56 so as to act on the upper face of the membrane 10. As the surface of the latter is larger than the section of closing of the valve head 8, and as the pressure acting on the diaphragm is substantially the same as that acting on the valve head 8, the diaphragm produces a downward movement of the rod 7, whereby the valve head 8 opens and the valve head 9 is closed. In this manner, the fluid arriving under pressure in the bore 3 can penetrate into the recess 2 and from here flow through the passage 5 which is connected by a passage to an apparatus of use, for example a hydraulic motor. The flow between said passage 5 and the passage 27 is interrupted by the valve 9 which rests on its seat.

When the excitation is interrupted, the spring 50 moves the core 42 downwardly, the orifice 51 is closed, whilst the orifice 45 is uncovered and, consequently, the fluid under pressure above the diaphragm can escape through the said orifice 45, whilst the fluid under pressure in the said recesses 2 and 3 has the effect of pushing the rod 7 upwards, thus provoking the opening of the valve 9 and the closing of the valve 8.

It is to be observed that the washer 23 forms a bearing surface for the diaphragm and that the fluid under pressure acting on the upper surface of said latter has the effect of progressively pressing it from outside towards the centre against this bearing surface. A relatively small clearance exists between the central hole of the washer 23 and the external diameter of the part 12 in the form of a bell containing the lining 11 of the valve head 9.

The thickness of the lining 11 is less in height than the recess of the part 12 in the form of a bell, and the position of said latter is selected in such a manner that its edge 13 abuts against the surface 15 constituting the bottom of the second cavity 4, in such a manner as to limit the movement of the stem 7 when the diaphragm is applied substantially over the whole of the bearing surface of the washer 23. This arrangement permits of using very high pressures of fluid acting on the diaphragm without subjecting the same to undue wear and tear. As the pressure is applied practically over the whole of the diaphragm surface, it is not subjected to shearing forces and may be constituted in a very simple manner by a washer of synthetic rubber. It is not necessary for the rubber constituting this washer to be reinforced by textile fibres. For this reason the diaphragm may be very pliant and relatively thin, which permits the use of the valve in the case of low pressure, for example of the order of 0.5 kg. per cm.². The same valve may be employed for very high pressures, as the diaphragm is supported by its bearing surface and it is possible to reach, without risk, pressures of the order of 100 kg. per cm.².

It is obvious that it is possible to obtain different combinations of the control of fluid with the valve shown. In fact, when the fluid under pressure is conducted by the passage 5 into the bore 2, it is possible to cause it to pass either into the passage 27, or into the passage 29, according to the position of the valves 8 and 9. In practice, it is possible to supply the fluid under pressure either into the first cavity 3 through the passage 29, as above described, or into the bore 2, or even through the passage 27. For connecting the supply of fluid under pressure to the orifice 51, it is possible to modify the passage 54 drilled in the body 1 of the valve. The only modification of the passage 54 is not very important from an industrial point of view, as it is possible to have a considerable stock of valve bodies in which no bore is made. Before the delivery, when it is known which mounting is to be adopted for the body of the valve, it is easy to effect the boring which is desired for the case. Another advantage of the construction described resides in the fact that its construction involves little cost, as the bore 2 and cavities 3 and 4 are cylindrical and have the same axis, so that the machining of the shoulders, bores and threads provided in these recesses may be produced on a lathe without modifying the position of the body 1 on the lathe.

The durability of said valve is very high, as, has already been stated above, the movements of the diaphragm are weak, even when using high pressures, and as the crushing of the plugs 11 of the valves on their seats is also limited by the part in the form of a bell forming a stop against the body of the valve, the life of the valves is practically unlimited, as it is possible to limit their maximum actuations to valves inferior to those which are dangerous for their preservation. It is also to be observed that the parallelopiped shape of the body of the valve is advantageous, as it permits of attaching a number of similar bodies together, for obtaining more complicated combinations of valve. It is for this reason that the bore 29 passes through the body 1 from one side to the other, which permits of forming a continuous passage supplying a number of valve bodies when these are assembled.

For this purpose, the body of the valve described has two bores 65 passing therethrough from side to side and allowing the passage of a tie adapted to press said body against a similar body of another valve. Further, the orifice of the bore 30, visible in the upper part of FIG. 4, is surrounded by an annular groove 66 adapted to serve as a partial seating for a joint 67 of elastic material.

It will be seen that when two similar valve bodies are connected by passing ties through their bores 65, a bore 30 of a body is located in the extension of the bore 30 of the other body, and the annular joint 67 clamped between the faces in contact with these two valve bodies, allows of a fluidtight connection between the bores 29 of these two bodies. It is thus possible to combine a quantity of bodies for constituting a control assembly, for example, for effecting different hydraulic controls of a machine, all the bores 29 of said bodies are located on a same line for forming a continuous passage, said passage being supplied by an external passage connected to one of the valve bodies at the end of the assembly, the body of the valve at the other end being provided with a plug closing its threaded bore 30.

It will be understood that numerous modifications may be applied to the form of construction described and, particularly, the control of the fluid acting on the diaphragm may be realised in a very different manner.

I claim:

1. A servo-valve for controlling apparatus to be operated, comprising in combination, a body having first and second cavities opening toward opposite ends of the body and each internally threaded at their outer ends and connected by a central bore, said body having a portion of a diaphragm by-pass communicating with said first cavity, said cavities respectively having a pressure inlet passage and an exhaust passage and the central bore having a passage communicating with the apparatus to be operated, a bevelled shoulder in the first cavity facing the threaded portion thereof, a plug engaged with said threaded portion and in contact with said bevelled shoulder, a stepped abutment in the second cavity, a closure ring engaging the threads of the second cavity, a primary valve seat disposed in said first cavity at the outer end of the central bore, a secondary valve seat disposed in said second cavity at the inner end of the bore, a valve stem operating in said bore, a primary valve head assembly cooperating with said primary valve seat, a secondary valve head assembly cooperating with said secondary valve seat, a cylindrical block having inner and outer faces and fitted in the second cavity and also having a transfer passage disposed at an angle to the axis of the block and communicating with the portion of the diaphragm by-pass in said body, said body also having an orifice in its outer face surrounded by depressed annular valve seat and a vent passage establishing communication between the inner and outer face of the block above the secondary valve head assembly, a washer resting on said stepped abutment of the body, a diaphragm carried by the secondary valve head assembly and clamped between the peripheral edge of the said washer and the inner peripheral edge of the said cylindrical block, and an electromagnetically controlled core mounted on said closure ring coaxially with the valve stem and having fluid escape means in its side wall, a spring for biasing the core to close said orifice and the vent passage in the block, said core when energized to overcome the force of spring establishing communication between the diaphragm by-pass and the first cavity as well as the transfer passage.

2. A servo-valve according to claim 1, wherein, the cylindrical block is provided at one side with a recess overlying the diaphragm and the upper valve head upon which the diaphragm is mounted, whereby, said aperture in the outer face of the block opposite the diaphragm is controlled by the core.

3. A servo-valve according to claim 1, wherein, the closure ring has a beveled edge and the cylindrical block is provided with an annularly recessed upper face providing a tapered relatively thin outer tongue portion to be engaged by said beveled surface on the closure ring.

4. A servo-valve according to claim 1, wherein, the electromagnetically controlled core is slidable in a tube, an an electric coil surrounds said tube, and a nipple is supported coaxially with the core and has a passage for registry with the orifice on the upper face of the block.

5. A servo-valve according to claim 1, wherein, the electromagnetically controlled core has gasket receiving recesses at opposite ends thereof and the sides of said core are provided with longitudinally disposed channels.

6. A servo-valve according to claim 1, wherein, the diametrically opposite channels have a cross-sectional area at least equal to twenty times the cross section of the said orifice in the upper face.

7. A servo-valve for controlling apparatus to be operated, comprising, a body having a first cavity connected with a fluid pressure inlet passage and a second cavity communicating with an exhaust passage, said body also having an axial bore communicating at one end with the first cavity and at its other end with the second cavity, said body also having a work-performing passage for establishing communication between the bore and the apparatus to be operated and further having a diaphragm by-pass, a valve seat at each end of said bore, a stem in said bore, a lower valve head at one end of the stem and operating in the first cavity, an upper valve head at the upper end of said stem and operating in the second cavity, a diaphragm in said second cavity and carried by said upper valve head, said diaphragm having an inner face exposed to said exhaust passage and an outer face, a cylindrical block fitted in the second cavity, and having a transfer passage for registry with said by-pass of the body, said block holding the diaphragm in place in the body and having a valve orifice at the end opposite its engagement with the diaphragm, said valve orifice being surrounded by a depressed portion communicating with a passage leading to the outer face of the diaphragm, a core spring-biased toward the block to close the orifice, and an electromagnetic coil energizable to remove the core from the orifice to establish communication between the first cavity and the outer face of the diaphragm to move the upper valve head onto its seat and simultaneously remove the lower valve head from its seat to admit pressure from the bore to said work passage.

8. A servo-valve for controlling apparatus to be operated, comprising, in combination, a body having a bore and coaxial first and second cavities opening towards opposite ends of the body, said first cavity having a pressure inlet passage and said second cavity having an exhaust passage, said body also having a work performing passage establishing communication between said bore and the apparatus to be operated, said body further having a by-pass eccentric to the axis of the bore, primary and secondary valves cooperating with said bore, a block secured in said second cavity to form a diaphragm chamber, a diaphragm having outer and inner sides carried by the secondary valve and operating in said chamber, said block having a transfer passage communicating with said by-pass and also having vent means communicating with said second cavity at the outer side of the diaphragm, a valve seat in the block and having an orifice, a solenoid valve normally spring-biased to close said orifice and to also block-off the entrance to said vent means, and an electrical circuit for actuating said solenoid to cover and uncover said orifice, whereby, when the solenoid uncovers the orifice, fluid pressure from the first cavity will flow through said by-pass and thence through transfer passage of the block and said vent means to the outer face of the diaphragm which will force secondary valve to its seat and unseat primary valve in cavity to cause pressure to flow through work-performing passage to operate the apparatus with which the unit is used.

References Cited in the file of this patent

UNITED STATES PATENTS

| | | |
|---|---|---|
| 2,377,227 | Griswold | May 29, 1945 |
| 2,460,908 | Scott | Feb. 8, 1949 |
| 2,515,519 | Lawrence, et al. | July 18, 1950 |
| 2,587,357 | McPherson | Feb. 26, 1952 |